Oct. 15, 1957  J. S. ATOLS  2,809,461
FISHING DEVICE
Filed June 25, 1954  3 Sheets-Sheet 1
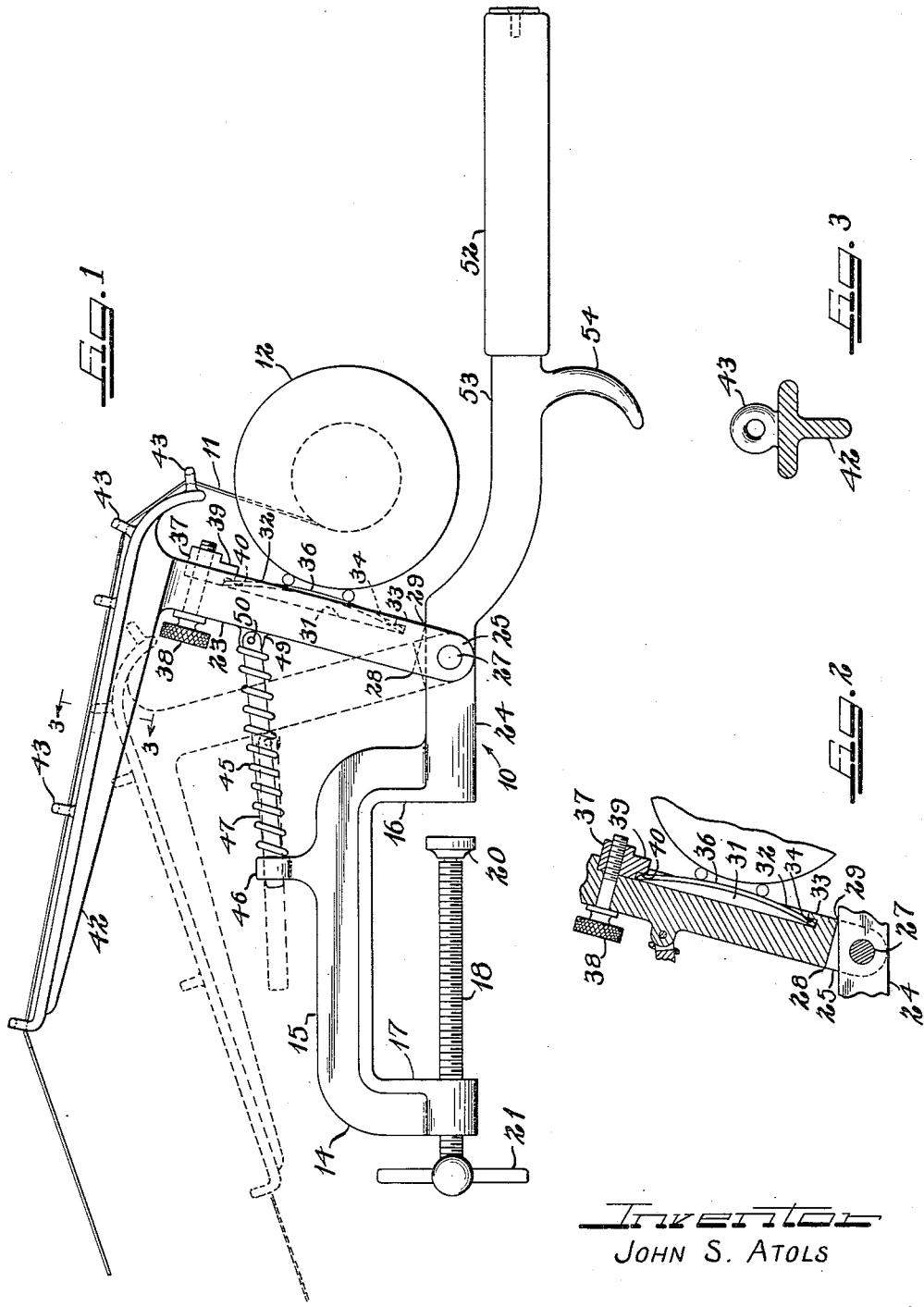
INVENTOR
JOHN S. ATOLS
Carlson, Pitzner, Hubbard & Wolfe
ATTYS.

Oct. 15, 1957  J. S. ATOLS  2,809,461
FISHING DEVICE
Filed June 25, 1954  3 Sheets-Sheet 2
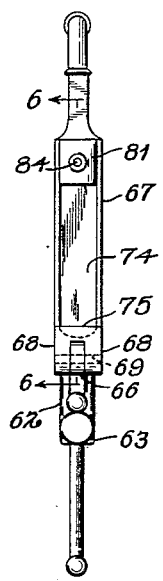
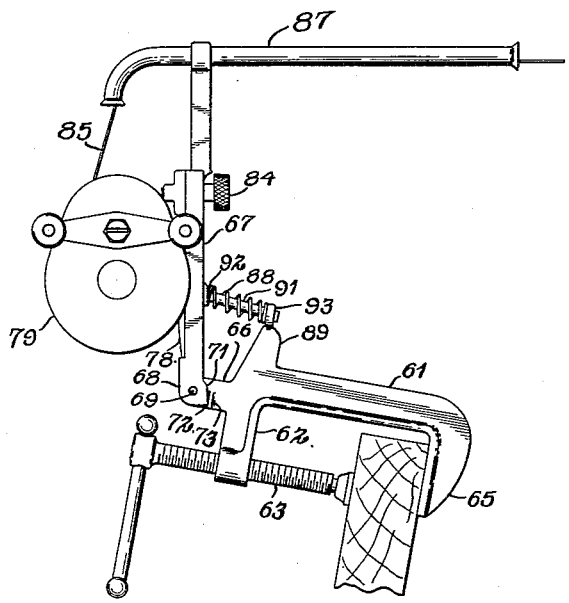
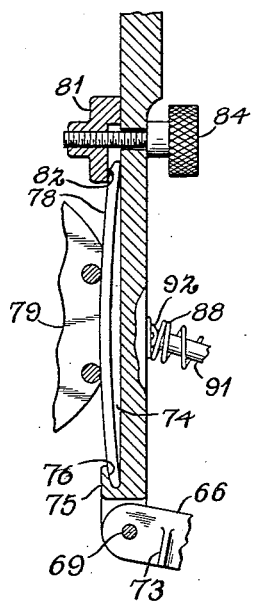
Inventor
JOHN S. ATOLS
Carlson, Pitzner, Hubbard & Wolfe
Attys.

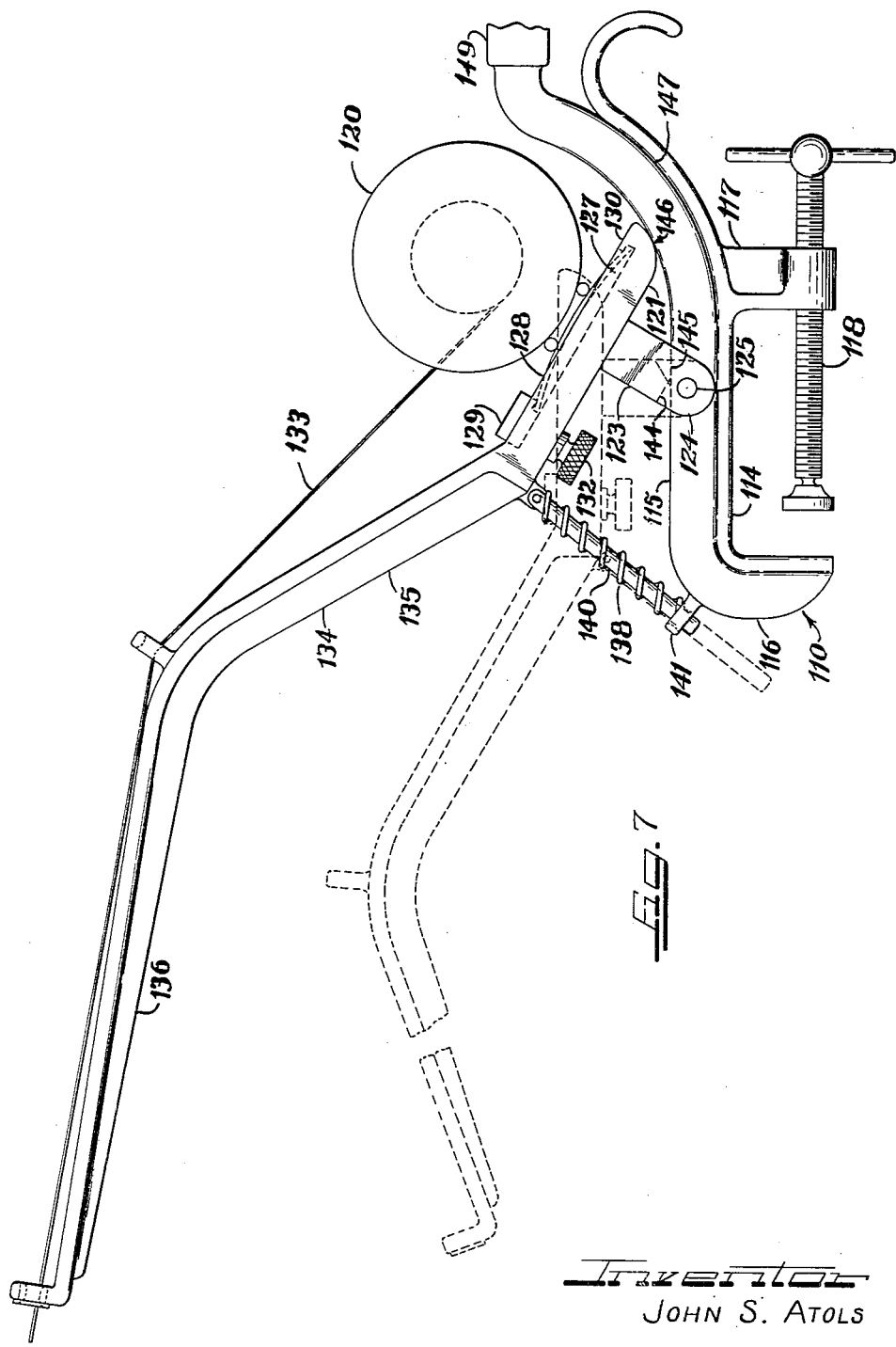

United States Patent Office 2,809,461
Patented Oct. 15, 1957

2,809,461

FISHING DEVICE

John S. Atols, Chicago, Ill.

Application June 25, 1954, Serial No. 439,346

3 Claims. (Cl. 43—18)

The present invention relates to a new and improved fishing device.

It is an object of the present invention to provide a supporting bracket for a fish line and reel such that the line and reel may be supported on a relatively stationary structure, such as a pier or dock, or the gunwale or transom on a boat. It is a further object of the present invention to provide a device of the foregoing type in which the line is resiliently anchored to the supporting bracket to permit the line to give a limited distance even though the reel may be locked.

It is also an object of the present invention to provide a supporting device for a fishing reel and line which is easily attached to a boat or a pier and which is capable of rigid, durable construction.

Other objects and advantages will become apparent as the following description proceeds, taken in connection with the accompanying drawings, in which:

Fig. 1 is a side elevation of a fishing device embodying the present invention and having a fishing reel and line shown in operative position.

Fig. 2 is a partial cross section taken along the midline of the vertical supporting member and shows the fastening means for the fishing reel.

Fig. 3 is a cross section taken along the line 3—3 of Fig. 1.

Fig. 4 is a side elevation of a modified form of fishing device embodying the present invention and having a fishing reel and line shown in position.

Fig. 5 is an end view of the supporting bracket shown in Fig. 4, with the reel and line removed.

Fig. 6 is a partial cross section taken along the line 6—6 of Fig. 5 and having a fishing reel attached.

Fig. 7 is a side elevation of a further modified form of fishing device embodying the invention.

While the invention is susceptible of various modifications, alternatives and variation, there is described herein in some detail the preferred embodiments of the invention, but it is to be understood that the intention is not to limit the invention to the specific forms disclosed, but on the contrary to cover all modifications and alternative constructions and uses falling within the scope and spirit of the invention as expressed in the appended claims.

Referring now to the drawings in more detail, there is shown in Fig. 1 an illustrative supporting device 10 embodying the present invention. The supporting device 10 is there shown in connection with a fishing line 11 and a fishing reel 12 in operative position. It will be appreciated that the fishing line 11 and reel 12 may be of any weight and size suitable for the type of fishing to be carried on.

In overall organization, the supporting device 10 comprises means for clamping the device to a stationary member and means for resiliently anchoring the fishing reel and fishing line to the clamping means, as well as guiding the fishing line. In the illustrative embodiments, the clamping means comprises a body member 14 in the form of a modified C clamp having a straight back section 15, with a depending anvil section 16 at its inner end. At the outer end of the back section of the clamp is a depending section 17 having a threaded aperture for receiving a clamping screw 18. The clamping screw 18 has on one end a swivel clamping head 20, and a handle in the form of a short transverse rod 21 at its other end. The clamping device 10 may be attached to the gunwale or transom of a boat, or to any convenient horizontal supporting structure, by rotating the clamping screw 18 to frictionally engage the supporting structure.

Positioned adjacent the inner end of the clamping body 14 is a relatively movable reel supporting member. As shown in the drawings, the reel supporting member comprises a generally vertical and relatively rigid rod or bar 23 pivotally mounted at its lower end to the clamping body. Support for the pivotal mounting of the vertical member 23 is provided by an inwardly extending body frame extension or bar 24 formed integrally with the lower end of the depending anvil section 16 of the clamping body 14 and positioned generally in line with the clamping screw 18. The lower end portion of the vertical supporting member 23 is bifurcated to form a pair of transversely spaced legs 25 positioned to extend along opposite sides of the frame extension or bar 24 on the clamping body. A pivot pin 27 is received in alined holes in the legs 25 of the vertical member 23 and the clamping body extension 24 to provide swinging movement of the vertical member 23 about an axis which extends transversely of the clamp body 14 so that the vertical member 23 can swing relative to the clamp body 14. The swing of the vertical member 23 is limited in both directions of swing by virtue of edge corners 28, 29 at the base of the spaced legs on the vertical member, which alternately abut against the upper surface of the inwardly extending supporting bar on the clamping body. The vertical supporting member is shown in solid outline in Fig. 1 in its normal position, and in forward position by dot-dash outline.

Means are provided on the inboard or back side of the vertical member 23 for removably attaching the fishing reel 12 thereto. For this purpose the inboard side of the vertical member 23 has a longitudinally extending groove or slot 31 formed by upstanding ridges 32 along its side edges. The lower end of the groove 31 is defined by a raised abutment 33 which is under cut to form a pocket 34. The pocket 34 formed in the abutment at the lower end of the groove has a shape corresponding to the lower end portion of a reel mounting bracket 36, which is supplied as a part of the well known type fishing reel 12. This permits the mounting bracket 36 of the reel to be placed in the mounting groove 31 and slipped downwardly until the lower end portion of the bracket is received in the pocket 34 to prevent outward movement of the lower end of reel bracket from the groove.

The mounting bracket 36 of the reel is detachably held in the mounting groove 31 by means of a removable abutment or fastener 37 which engages the upper end portion of the reel mounting bracket 36 and holds the latter against movement both longitudinally and outwardly of the groove. As shown in the drawings, the removable fastener 37 comprises a small block having a width corresponding to that of the mounting groove for reception in the upper end portion of the groove 31. A threaded fastener element, such as a screw having a knurled head 38 is received in and projects rearwardly through an aperture in the vertical supporting member 23 and engages a screw threaded hole in the fastener block 37. The underside of the fastener block 37 is formed with a projection 39 position on its end surface facing the groove and spaced from its underside. The bottom surface of the block and the projection together with the bottom wall of the groove define a pocket 40 which opens to the upper end of the groove to receive the upper end portion of the reel mounting bracket 36. Thus to attach or detach the reel 12 from the vertical supporting member 23, it is merely necessary to loosen or tighten the fastener block 37 by means of the fastener screw 38 to engage or disengage the upper end portion of the reel bracket.

The transverse distance between the side ridges 32 and longitudinal distance between the end abutments 33, 37 which define the reel bracket receiving groove 31 are determined according to the dimensions of the reel bracket 36. The width of the groove is slightly larger than the width of the reel bracket and the length of the grove measured between the bottoms of the pockets 34, 40 is slightly longer than the length of the reel bracket. To insure retention of the reel bracket in the groove the distance between the end faces of the abutments 33, 37, that is, the top edges of the pockets, is somewhat less than the length of the reel bracket. This provides engagement between the side walls of the pockets 34, 40 and the underlying end portions of the reel bracket.

Means are provided at the upper end of the vertical supporting member 23 for guiding the fishing line 11. In the embodiment shown in the drawings, this means guides the line upwardly from the reel 12 and outwardly from the relatively stationary support and the clamping body 14. For this purpose a substantially horizontal guide member is formed rigidly on the upper end of the vertical support member 23 and comprises a solid guide arm 42 of T-shaped cross section, as shown in Fig. 3 and in prependicular relation to the vertical support member. Mounted on the upper surface of the horizontal guide arm 42 is guide means in the form of a series of eyelets 43 which receive the fishing line 11 and guide it upwardly from the reel and outwardly from the clamping body. The inner end portion of the horizontal guide arm preferably extends inwardly beyond the vertical supporting member 23 and curves or hooks downwardly toward the fishing reel 12 and has eyelets 43 thereon to direct the line downwardly toward the center of the reel.

Means for resiliently anchoring the fishing line to the clamping body is provided to permit the fishing line to extend or give when a fish strikes the hook on the fishing line, much in the same manner of the resilient bending of the customary fishing rods or poles. In the embodiment shown in Fig. 1 of the drawings, such means comprises a resilient biasing means adapted to urge the vertical supporting arm 23 into its inboard or rear limit position and to permit the vertical arm to swing forwardly against the resilient force of the biasing means. In the instant embodiment, a coil spring 45 is interposed between the forward or outboard side of the vertical support arm 23 and an upwardly extending projection or abutment 46 on the back section 15 of the clamping body. The spring 45 at one end engages the vertical member 23 at a point spaced upwardly from its pivotal mounting connection, and preferably slightly above the midsection of the vertical arm. The spring abutment 46 on the back section 15 of the clamp body 14 is spaced upwardly so that it is disposed more or less in horizontal alinement with respect to the point of engagement of the spring 45 and the vertical member 23.

To maintain the coil spring 45 in position and prevent it from bowing sidewise, a guide rod 47 is provided and extends through the center of the spring. One end portion of the spring guide rod 47 is pivotally connected to the vertical supporting arm, by a forwardly projecting ear 49 on the vertical member 23 and a transverse pivot pin 50. The other end of the guide 57 extends through an alined hole in the spring abutment 46 on the back section of the clamp body 15 and forms therewith an axially slidable connection to permit movement of the vertical member 23 and guide rod 47 relative to the clamp body 15.

It will thus be seen that there is provided an efficient device for supporting and guiding a fishing line from a boat or pier. In operation, the fishing reel 12 will be mounted on the vertical support 23 and the fishing line 11 threaded through the eyelets 43 on the guide arm 42. A fishing hook and bait or other fishing lure are attached to the free end of the line 11 in the usual manner. After the desired amount of line is played out, the reel may be locked and the vertical supporting member 23 with the attached reel and line is resiliently held in the inboard or normal position. When a fish hits the bait and hook, the line is not rigidly held but will extend or give a short distance under the increasing resilient force of the bias spring 45, so that the hook is not jeked from the fish. The action is much like that accompanying the involuntary action of a person holding a fishing line and of a resilient fishing pole or rod.

After a fish is hooked, the line 11 may be reeled in. For this purpose, and also to provide freedom for playing the fish, it is desirable to be able to hold the supporting device by hand independently of the stationary structure on which the device is mounted. To this end, a handle 52 may be provided which is rigidly mounted on the clamping body 14. As shown in Fig. 1 of the drawing, the handle 52 is conveniently positioned in alinement with the axis of the clamping body 14 upon a handle attaching extension 53 of the inwardly extending body frame bar 24. In profile view, the frame bar 24 has a straight forward section adjacent the clamping body 14, and a straight rear section to which a handle of any desired size or shape may be provided. Intermediate the straight sections in a downwardly curved section which serves to lower the position of the rear section and the handle and provide clearance between the bottom of the fishing reel and top of handle 52 and handle extension 53. If desired the handle attaching extension 53 of the frame bar may be provided with a depending, curved finger grip 54.

In Figs. 4 to 6, inclusive, there is shown a modified form of fishing device of somewhat simplified construction. In the embodiment of the invention of Figs. 4 to 6, a clamping body 61 of a form similar to that shown in Figs. 1 and 2 is illustrated. In this instance, however, the clamping body 61 is reversed so that it has a depending section 62 for receiving a clamping screw 63 which extends inwardly and a depending anvil portion 65 which is positioned on the outboard end of the clamping body 61. Integral with the clamping body 61 at the upper end portion of the inboard depending section 62 is an inwardly extending projection 66 to which is pivotally attached a vertical line and reel supporting member 67. The vertical supporting member 67 is bifurcated at its lower end portion, forming a pair of spaced legs 68 which are pivotally mounted to the inwardly extending projection 66 by means of a transverse pivot pin 69 to provide swing of the vertical member 67 in the same manner as previously described in connection with the mebodiment of Figs. 1 to 3.

The swing of the vertical member is limited by engagement of upper and lower corners 71, 72 on the forward edges of the legs 68 of vertical member and laterally projecting abutments 73 on the projection or lug 66.

The inner or rear face of the vertical supporting member 67 is provided with a groove 74 and lower abutment 75 having an undercut pocket 76 for receiving the supporting bracket 78 of a reel 79 in the same manner as the embodiment shown in Figs. 1–3. The upper end of the reel mounting groove 74 is provided with a removable fastener block 81 having an undercut portion forming a pocket 82 to engage the upper end portion of the reel supporting bracket 78. A fastener screw 84 passes through an aperture in the vertical supporting member 67 and is threadably received in the fastener block 81 for detachably holding the reel supporting bracket 78 in the groove 74.

In the embodiment of Figs. 4 to 6, guide means for the fishing line, indicated by the reference numeral 85, is provided at the upper end of the vertical supporting member 67. For this purpose the upper end portion of the vertical supporting member 67 may be apertured to receive a cylindrical guide in the form of a metal tube 87. The inner end of the metal tube 87 inwardly of the vertical supporting member 67 is curved downwardly so that its open end points in the direction of the fishing reel 79. The outer end portion of the guide tube 87 preferably extends adjacent to or beyond the outer end portion of the clamping body. The ends of the guide tube 87 may have flared or rounded edge portions to provide a smooth entrance and exit for the fishing line.

Means for resiliently anchoring the reel 79 and fishing line 85 to the clamping body in the embodiment shown in the Figs. 4–6, comprises a resilient bias means in the form of a compression coil spring 88 which is interposed between the forward or outboard side of the vertical supporting member 67 and an upwardly extending projection 89 on the clamping body 61. As in the embodiment shown in Figs. 1 to 3 of the drawings, the instant construction has a spring guide rod 91 positioned centrally of the coil spring 88 and having a pivotal connection 92 at one end and a slidable connection 93 at the other end to the vertical supporting member 67 and clamping body 61, respectively.

In use, the modified construction of Figs. 4–6 operates in the same manner as the construction of Figs. 1–3, differing primarily in that the modified construction is held by grasping either the clamping body 61 or the reel and vertical supporting member 67 if it is desired to hold the line by hand.

Another modified form of fishing device, indicated by the reference numeral 110 and embodying the invention is illustrated in Fig. 7 of the drawings. In the construction there shown the means for clamping the device comprises a body 114 in the form of a C-shaped clamp having a back section 115 and depending end portions 116, 117, one of which has a threaded aperture to receive a clamping screw 118, in the same manner described in connection with the constructions of Figs. 1 to 6. Preferably, the clamping screw 118 is on the rear or inboard end portion 117 of the clamping body to permit manipulation of the screw 118 without the necessity of reaching to the front or outside of the device.

In the instant construction, means for supporting or mounting a fishing reel 120 on the clamping body 114 comprises a relatively rigid reel supporting member 121. The latter is positioned over the back section 115 of the clamping body 114 and in more or less parallel, spaced relation thereto. The reel 120 and reel supporting member 121 are mounted on the clamping body 114 by means of a pivotal connection to permit swinging of the reel and reel supporting member relative to the clamping body 114 in forward and rearward directions. For this purpose, a depending lug or projection 123 is formed on the central portion of the bottom of the reel supporting member 121 and is provided at its lower end portion with a pair of spaced legs 124 which straddle the back section 115. A transverse pivot pin 125 interconnects the legs 124 and back section 115 to permit the desired longitudinal swing.

On the upper face of the reel supporting member 121, fastening means are provided for removably holding the fishing reel 120 to the supporting member. The fastening means illustrated in the construction of Fig. 7 is the same as that previously described, being formed by a longitudinal groove 127 to receive a supporting bracket 128 integral with the reel 120 and having end abutments 129, 130 defining undercut pockets to receive and hold the respective end portions of the reel supporting bracket 128. One of the end abutments 129 is removable as by screw 132 to permit attachment and detachment of the reel.

Extending forwardly and upwardly from the outer end portion of the reel supporting member are means for guiding a fishing device 133 from the reel outwardly over the side of the board or other supporting structure. In the exemplary construction of Fig. 7, the guide means comprises a guide arm 134 of T-shaped cross section and formed integrally with reel supporting member 121. The guide arm has an upwardly positioned central section forming an inner portion 135 which extends upwardly and forwardly from the reel supporting member and an outer portion 136 which is positioned at a downward angle relative to the reel supporting member. The outer portion 136 of the guide arm terminates at a point substantially on a line drawn from the fishing reel parallel to the reel supporting member 121. The reason to such alinement will be explained presently.

In the present embodiment of the invention, means for resiliently anchoring or attaching the fishing line and reel to the clamping body is in the form of a compression coil spring 138 interposed between the under or forward side of the reel supporting member 121 and the top of the clamping body 114. As in the embodiments of the invention previously described, the resilient member or spring 138 engages the reel supporting member at a point spaced from its pivotal connection in the direction to resist pull on the fish line, that is, at a point between the pivotal connection and the end of the guide arm. A spring guide rod 140 is positioned centrally of the coil spring 138 and interconnected between the supporting member 121 and a projection 141 on the body 114 with a pivotal connection at one end and an axially slidable connection at the other.

Forward and rearward swing of the reel supporting member may be limited if desired by means of abutment surfaces 144, 145 formed on the lower end of the depending projection 123 between the bases of the spaced legs 124. As shown in Fig. 7, the forward one of these, surface 144, is substantially parallel to the upper surface of the reel supporting member 121, limiting forward swing by engaging the back section 115 of the clamping body when the reel supporting member is substantially parallel to the clamping body 114, as shown in dot-dash outline. The rear one of the abutment surface 145 is inclined at an upward angle, for example in the neighborhood of thirty degrees, to limit rearward swing of the reel supporting member. Alternatively, the limit or stop means may be provided in one direction by the inner or rear end of the reel supporting member 121 engaging the clamping body, as at 146, and in the other direction by the bias spring 138 which can be adjusted in length to be completely compressed or bottomed at the desired forward limit position.

As previously described, the outer end of the fishing line guide arm 134 is substantially on a line which is parallel to the reel supporting member 121 and intersects the reel 120. One of the advantageous features of the construction of Fig. 7 is the provision of handle means which lies on an extension of this common line when the reel supporting member 121 is in the forward position under force applied to the fishing line. As shown in Fig. 7, the back section 115 of the clamping body 114 has an inwardly and upwardly curved projection 147 terminating in an inwardly directed straight portion to which a handle 149 may be attached. By thus positioning the handle such that the axis of the handle 149, center of the reel 120, and terminus of the fishing line guide arm 134 lie substantially on a single line when the supporting member 121 is in its forward limit position, there is little tendency for the fishing device to turn or rock sidewise in the fisherman's hand.

The construction illustrated in Fig. 7 has the further advantage that the handle 149 is positioned to extend away from the side of the fishing reel 120 which permits the fisherman to put the thumb of his hand on the fishing line wound on the reel to brake the reel, if desired.

I claim as my invention:

1. A fishing device for mounting a fishing line and reel on a supporting structure comprising in combination a clamp having a horizontal body portion and depending end portions and a clamping screw threadedly received in one of said end portions for attachment of said clamp to a supporting structure, a substantially rigid supporting member having a pair of transversely spaced legs thereon, said legs being positioned on opposite sides of said clamp body, a transverse pivot pin interconnecting said legs and clamp body for inward and outward swinging movement of said supporting member relative to said clamp, inwardly and outwardly spaced, abutment means on said supporting member positioned to engage said clamp body at points spaced longitudinally thereon for limiting the swing of said supporting member between forward and rearward limit positions, said supporting member having a pair of longitudinal ridges and a pair of end abutments to define a groove on one surface of said supporting member for receiving the mounting bracket of a fishing reel, said end abutments being undercut to form pockets opening into said groove and one of said abutments being removably mounted on said supporting member to permit attachment and removal of the fishing reel mounting bracket, an upstanding abutment on said clamp body spaced longitudinally from the pivotal connection between said clamp body and supporting member, a compression coil spring interposed between said upstanding abutment and said supporting member for urging said supporting member to its rearward limit position, a guide rod positioned centrally of said spring and having a pivotal connection at one end and an axially slidable connection at the other end for interconnecting said rod between said upstanding abutment and said supporting member, and means positioned on one end portion of said supporting member and extending forwardly therefrom for guiding a fishing line from said fishing reel forwardly away from said supporting member.

2. A fishing device for mounting a fishing line and reel on a supporting structure comprising in combination a body having means for clamping the body to a supporting structure, an upwardly extending supporting member positioned above said body having a pair of transversely spaced, depending legs on its lower portion, said legs being positioned on opposite sides of said body, a transverse pivot pin interconnecting said legs and said body for fore and aft swinging movement of said supporting member relative to said body, abutment means for limiting the swing of said supporting member between forward and rearward limit positions, said supporting member having means on the rear face thereof for removably mounting a fishing reel on said supporting member, an abutment on said clamping body, a coil spring interposed between said abutment and said supporting member, a guide rod positioned centrally of said spring and having a pivotal connection at one end and an axially slidable connection at the other end for interconnecting said rod between said abutment and said supporting member, and means including a substantially rigid arm positioned on the upper end portion of said supporting member and extending forwardly therefrom for receiving and guiding a fishing line upwardly from said reel and forwardly away from said supporting member.

3. A fishing device for mounting a fishing line and reel on a supporting structure comprising in combination a clamp having a body and means for attaching said body to a supporting structure, a substantially rigid upwardly projecting support member having a pivotal connection on its lower portion with said clamp body for forward and rearward swinging movement of said support member relative to said clamp, abutment means on said clamp body and support means for limiting the swing of said support member between forward and rearward limit positions, said supporting member having means defining a groove in the rearwardly facing surface of said supporting member for removably receiving a supporting bracket on a fishing reel, an upstanding abutment on said clamping body, a compression coil spring interposed between said upstanding abutment and the forward face of said supporting member, a guide rod positioned centrally of said spring and having a pivotal connection at one end and an axially slidable connection at the other end for interconnecting said rod between said upstanding abutment and said supporting member, and means including a substantially horizontal arm integral with said supporting member and positioned at the upper end of said the latter and extending forwardly therefrom for receiving a fishing line to guide the same upwardly from said reel and forwardly away from said supporting member.

References Cited in the file of this patent

UNITED STATES PATENTS

| | | |
|---|---|---|
| 986,501 | Roberts | Mar. 14, 1911 |
| 2,065,153 | Proudfit | Dec. 22, 1936 |
| 2,177,912 | Spitz et al. | Oct. 31, 1939 |
| 2,482,999 | Bean | Sept. 27, 1949 |
| 2,516,245 | Nickerson | July 25, 1950 |
| 2,522,255 | Climo | Sept. 12, 1950 |
| 2,657,492 | Skorr | Nov. 3, 1953 |